United States Patent

Grass et al.

[11] Patent Number: 6,029,784
[45] Date of Patent: Feb. 29, 2000

[54] VEHICLE HAVING AN AUTOMATICALLY ACTUATED CLUTCH

[75] Inventors: Thomas Grass, Urbach; Bernd Koch, Backnang; Franz Kosik, Ostfildern, all of Germany

[73] Assignee: Daimler-Benz Aktiengesellschaft, Stuttgart, Germany

[21] Appl. No.: 09/174,688

[22] Filed: Oct. 19, 1998

[30] Foreign Application Priority Data

Oct. 17, 1997 [DE] Germany ............... 197 45 675

[51] Int. Cl.[7] ............... B60K 41/22; B60K 41/02
[52] U.S. Cl. ............... 192/3.55; 477/87
[58] Field of Search ............... 477/74, 87; 192/3.55

[56] References Cited

U.S. PATENT DOCUMENTS 4,778,038 10/1988 Ohkawa et al. ............... 192/3.55
4,971,183 11/1990 Tellert ............... 192/3.55
5,005,680 4/1991 Satoh et al. ............... 192/3.55

FOREIGN PATENT DOCUMENTS 44 26 260 2/1995 Germany .

OTHER PUBLICATIONS

German periodical Krafthand, "Schalten von Hand und Kuppeln automatisch," vol. 9, May 11, 1991, Described in specification.

Primary Examiner—Rodney H. Bonck
Assistant Examiner—Tisha D. Waddell
Attorney, Agent, or Firm—Kenyon & Kenyon

[57] ABSTRACT

In a vehicle having an automatically actuatable clutch arranged in the drive train between engine and transmission, the clutch is released or maintained released in the event of a brief interruption in the power supply to the clutch control device while activation of the clutch control device still exists.

7 Claims, 1 Drawing Sheet

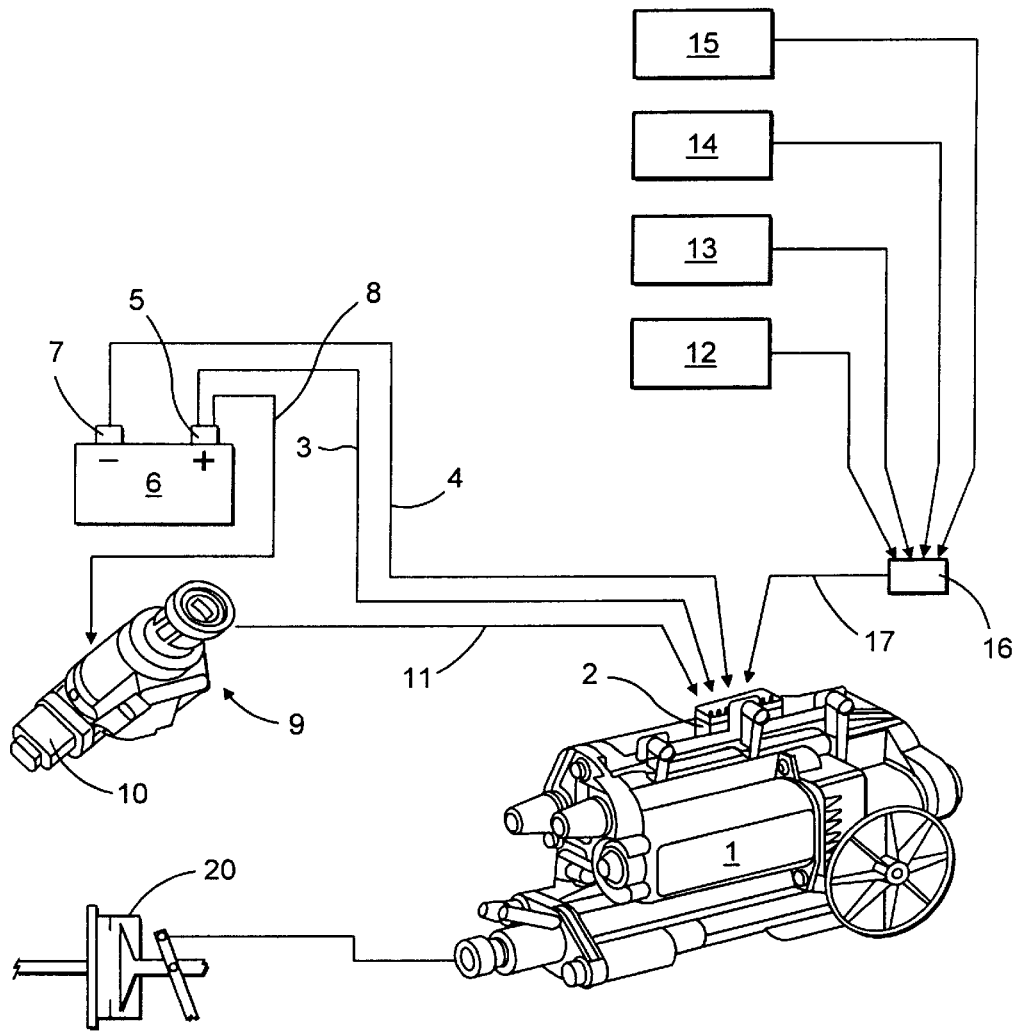
F I G. 1

VEHICLE HAVING AN AUTOMATICALLY ACTUATED CLUTCH

FIELD OF THE INVENTION

The present invention concerns a vehicle having an automatically actuated clutch arranged in the drive train between engine and transmission.

RELATED TECHNOLOGY

Vehicles having an automatically actuated clutch are, for example, defined in the German periodical Krafthand, Vol. 9, May 11, 1991, pages 612 to 613. In such vehicles actuation of the clutch release apparatus for changing gear ratios in the transmission takes place through the intermediary of an output electronics system, generally via a positioning motor. The output stage is powered by the vehicle battery via the continuous positive terminal. Power can also be supplied to the clutch control device in this manner. The clutch control device is generally activated when the ignition is turned on, and may also be activated by actuation of the brake pedal. The ignition lock is connected directly to the power supply and is typically separately fused.

For vehicles with an automatically actuated clutch, as described in German Patent Application No. 44 26 260 A1, it is known to monitor the system for faults and, in the event serious system faults are detected, to provide suitable remedies or emergency measures for safety reasons. For example, in the event of failure of the power supply, the system is deactivated, engaging the clutch.

If the power supply does not fail completely, but power to the clutch control device is only briefly interrupted, e.g., by a loose contact, critical situations can result when the power supply is reestablished. For example, if the clutch were to engage, i.e., move into a fully engaged position, as the power supply to the control device is reestablished with a gear engaged and the engine running, the vehicle might begin to move unintentionally.

SUMMARY OF THE INVENTION

In order to prevent improper functions of the kind described above, and similar improper functions, the present invention provides a vehicle having an automatically actuatable clutch arranged in the drive train between engine and transmission, having a positioning device associated with the clutch, having a power source, and having a clutch control device that is connected to the power source and can be activated and deactivated via switching-in and switching-out signals. When the control device (1) is switched in (i.e., on), and there is a brief interruption in its power supply, and the power supply is resumed, the clutch is released or kept released, at least if a gear is engaged and an engine speed greater than zero is present.

In supplementary fashion, according to the present invention provision may also be made for the clutch to be released or kept released if the vehicle is at a standstill or if a vehicle speed below a predefined and relatively low limit value is present.

BRIEF DESCRIPTION OF THE DRAWING

The present invention will be explained in more detail below with reference to the drawing, in which:

FIG. 1 shows a schematized depiction of an exemplary embodiment of the present invention having a control device for automatic actuation of a clutch, including manipulated variables which influence the function of the control device, and the relevant power supply.

DETAILED DESCRIPTION

In the exemplary embodiment of the present invention depicted in FIG. 1, 1 designates the clutch control device 1 for automated actuation of a clutch 20. Neither the drive train of the vehicle in which the clutch arranged between the engine and transmission, nor the vehicle itself, are shown. On clutch control device 1 is a connecting socket 2 for the electrical lines which supply power and transmit control signals.

Power is supplied via lines 3 and 4, of which line 3 is connected to positive pole 5 of a battery 6 (terminal 30), while line 4 is attached to negative pole 7 of battery 6 (terminal 31). Also connected to positive pole 5 via a line 8 is ignition lock 9. Ignition switch 10 of ignition lock 9 activates control device 1 when the ignition is turned on, the corresponding line being designated 11. Line 11 is connected to ignition lock 9 in a manner not shown in more detail (terminal 15).

Also depicted symbolically are further control devices which are associated with the same vehicle. These control devices are, for example, an engine control device 12, a braking control device 13, a climate control device 14, and a combi instrument 15. Their signals are delivered via line 17 through a CAN bus 16 to control device 1.

Should a brief interruption in the power supply to control device 1 occur, as can generally occur because of a loose contact or the like, control device 1 remains "switched-in" because the activation signal is still present, but it is briefly incapable of performing its function for lack of a power supply. This can result in critical situations, either because signals pending during the brief power supply interruption could not be processed, or because undesired functions are triggered by the momentary loss of power. One possible critical situation results, for example, when, during or shortly after the reactivation of power supply to control device 1, the clutch 20 is moved into a fully engaged position, with a corresponding transfer of torque into the drive train. Should this happen, for example, when a gear is engaged and the engine is running, an acceleration of the vehicle from rest can also occur.

In order to prevent such situations, the present invention prevents engagement of the clutch when the power supply is reestablished if a gear is engaged and the engine speed is greater than zero. Preferably, the clutch is prevented from engaging when, additionally, the vehicle is at a standstill or if the vehicle speed is below a predefined and relatively low limit value.

The present invention prevents any engagement of the clutch immediately after a resumption in power supply, i.e, keeps the clutch at least substantially released in this phase. The present invention thus allows the control device to reorient itself and, with an awareness of the current situation and proceeding from a released clutch condition, provide control instructions suitable for the situation.

The present application hereby incorporates U.S. patent application Ser. No. 09/174,848, entitled "Vehicle Having an Automatically Actuated Clutch," and filed on even date herewith.

What is claimed is:

1. A vehicle comprising:
    an automatically actuatable clutch disposed in a drive train between an engine and a transmission;
    a power source; and
    a clutch control device capable of being connected to the power source and capable of being activated and deactivated via switching-in and switching-out signals;

wherein when the clutch control device is activated and the clutch control device is briefly disconnected from and reconnected to the power source, the clutch is released or maintained released.

2. The vehicle as recited in claim 1 wherein the clutch is released or maintained released only if a gear of the transmission is engaged and an engine speed is greater than zero.

3. The vehicle as recited in claim 1 wherein the clutch is released or maintained released only if a vehicle speed is less than a relatively low limit value.

4. The vehicle as recited in claim 3 wherein the clutch is released or maintained released only if a vehicle speed is less than zero.

5. The vehicle as recited in claim 2 wherein the clutch is released or maintained released only if a vehicle speed is less than a relatively low limit value.

6. The vehicle as recited in claim 5 wherein the clutch is released or maintained released only if a vehicle speed is less than zero.

7. A method for controlling an automatically actuatable clutch disposed in a drive train between an engine and a transmission in a vehicle, the vehicle including a power source, and a clutch control device capable of being connected to the power source and capable of being activated and deactivated via switching-in and switching-out signals, the method comprising:

activating the clutch control device; and releasing the clutch or maintaining the clutch released when the clutch control device is briefly disconnected from and reconnected to the power source.

\* \* \* \* \*

UNITED STATES PATENT AND TRADEMARK OFFICE
CERTIFICATE OF CORRECTION

PATENT No. : 6,029,784

DATED : February 29, 2000

INVENTOR(S): GRASS et al.

It is certified that error appears in the above-identified patent and that said Letters Patent is hereby corrected as shown below:

Column 2, line 56, after "application Ser. No." change "09/174,848" to -- 09/174,849 --.

Signed and Sealed this

Seventeenth Day of April, 2001

*Attest:*

NICHOLAS P. GODICI

*Attesting Officer*     *Acting Director of the United States Patent and Trademark Office*